United States Patent
Harvey et al.

(10) Patent No.: US 8,104,710 B2
(45) Date of Patent: Jan. 31, 2012

(54) ACTUATOR ARRANGEMENT

(75) Inventors: John Herbert Harvey, Wolverhampton (GB); Mark Hubberstey, Wolverhampton (GB); Tony Jones, Birmingham (GB)

(73) Assignee: Goodrich Actuation Systems Limited (GB)

( * ) Notice: Subject to any disclaimer, the term of this patent is extended or adjusted under 35 U.S.C. 154(b) by 781 days.

(21) Appl. No.: 12/108,907

(22) Filed: Apr. 24, 2008

(65) Prior Publication Data

US 2009/0200420 A1 Aug. 13, 2009

(30) Foreign Application Priority Data

Apr. 25, 2007 (GB) .................................. 0707999.9
May 22, 2007 (GB) .................................. 0709741.3

(51) Int. Cl.
*B64C 3/38* (2006.01)
(52) U.S. Cl. ..................... 244/99.2; 244/99.3; 244/99.4; 244/213
(58) Field of Classification Search ............... 244/99.2, 244/99.3, 99.4, 213, 214, 215; 74/383
See application file for complete search history.

(56) References Cited

U.S. PATENT DOCUMENTS

| | | | | |
|---|---|---|---|---|
| 2,698,753 A * | 1/1955 | Kellman et al. | ................. | 49/349 |
| 3,229,545 A | 1/1966 | Hautau | | |
| 4,284,254 A * | 8/1981 | Rieben | .......................... | 244/99.2 |
| 5,306,136 A | 4/1994 | Oomori et al. | | |
| 5,378,282 A | 1/1995 | Pollard | | |
| 5,651,513 A * | 7/1997 | Arena | .......................... | 244/99.3 |
| 5,916,328 A | 6/1999 | Pritschow et al. | | |
| 6,010,097 A * | 1/2000 | Cox | .............................. | 244/216 |
| 6,382,566 B1 | 5/2002 | Ferrel et al. | | |
| 6,755,376 B1 * | 6/2004 | Broberg | ....................... | 244/99.2 |
| 7,063,292 B2 * | 6/2006 | Perez-Sanchez | ............. | 244/216 |
| 7,607,611 B2 * | 10/2009 | Wingett et al. | .............. | 244/99.3 |
| 2004/0123694 A1 | 7/2004 | Negri | | |
| 2004/0200928 A1 * | 10/2004 | Degenholtz et al. | ........ | 244/75 R |
| 2006/0144996 A1 * | 7/2006 | Carl et al. | ..................... | 244/99.2 |
| 2010/0096498 A1 * | 4/2010 | Mckay | .......................... | 244/99.2 |

OTHER PUBLICATIONS

European Search Report dated Dec. 3, 2009.

* cited by examiner

*Primary Examiner* — Christopher P Ellis
(74) *Attorney, Agent, or Firm* — Andrus, Sceales, Starke & Sawall, LLP

(57) ABSTRACT

An actuator arrangement comprises a first screw shaft, a first nut cooperating with the first screw shaft such that rotation of the first screw shaft causes the first nut to translate thereon, a second screw shaft, a second nut cooperating with the second screw shaft such that rotation of the second screw shaft causes the second nut to translate thereon, and first and second linkages connecting the first and second nuts, respectively, to an output member, rotation of the first and second screw shafts to cause translation of the first and second nuts towards one another causing extending movement of the output member and rotation of the first and second screw shafts to cause translation of the first and second nuts away from one another causing retracting movement of the output member.

15 Claims, 5 Drawing Sheets

ACTUATOR ARRANGEMENT

This invention relates to an actuator arrangement suitable for use in driving a flight control surface of an aircraft wing between retracted and extended positions.

One form of actuator used in driving a flight control surface, for example in the form of a wing slat, between retracted and extended positions comprises a pinion gear driven, in use, by a motor and gearbox arrangement, and an elongate toothed rack member, the teeth of which cooperate with the teeth of the pinion gear such that rotation of the pinion gear causes the rack member to translate. The pinion gear is mounted, through appropriate bearings, to the front spar of the wing, for example, and the rack member is connected to the wing slat. In use, rotation of the pinion gear drives the rack member, and hence the wing slat, for translating movement relative to the front spar.

The rack member used in such an arrangement is typically of rigid form and translates, in use, by the same distance as the wing slat. In order to accommodate such movement of the rack member, it may be necessary to provide an opening in the front spar through which part of the rack member can pass. This is undesirable as the surrounding part of the front spar requires reinforcement in order to maintain the structural integrity thereof, and this carries weight penalties. Further, the rack member may pass through parts of the wing usually used to accommodate, for example, the aircraft's fuel tanks necessitating the redesign of the fuel tanks.

An additional disadvantage of such an arrangement is that the path of movement of the wing slat is dictated by the shape of the rack member, which is typically of shallow arcuate form, and so achieving relatively complex profiles for the path of movement of the wing slat is difficult.

It is an object of the invention to provide an actuator arrangement in which these disadvantages are obviated or mitigated.

According to the present invention there is provided an actuator arrangement comprising a first screw shaft, a first nut cooperating with the first screw shaft such that rotation of the first screw shaft causes the first nut to translate thereon, a second screw shaft, a second nut cooperating with the second screw shaft such that rotation of the second screw shaft causes the second nut to translate thereon, and first and second linkages connecting the first and second nuts, respectively, to an output member, rotation of the first and second screw shafts to cause translation of the first and second nuts towards one another causing extending movement of the output member and rotation of the first and second screw shafts to cause translation of the first and second nuts away from one another causing retracting movement of the output member.

Such an arrangement is advantageous in that, as the use of a rigid, translating rack member is avoided, and all components of the actuator arrangement are located to the same side of the front spar at all times, the formation of openings in the front spar of the aircraft's wing can be avoided.

The first and second screw shafts are conveniently coaxial with one another.

Preferably, the output member is designed to accommodate angular, tilting movement of a wing slat connected to the output member relative to the first and second linkages.

Preferably at least a pair of actuator arrangements of the type described hereinbefore is associated with a single wing slat. Preferably, synchronisation means are provided to ensure that the actuator arrangements are operated simultaneously at the same speed as one another.

Guide track means may be provided to guide the wing slat for movement.

It will be appreciated that, in such an arrangement, the shape of the guide track means can be chosen to define a desired profile or path of movement for the wing slat. For example, an initial part of the extending movement of the wing slat can be substantially linear or along a shallow arc, the wing slat moving or pivoting through a relatively large angle as its fully extended position is reached.

Alternatively, or additionally, the actuator arrangement may further comprise guide means for adjusting the vertical position of the output member relative to a datum position during extending and retracting movement thereof.

The guide means may comprise a guide track along which a follower rides to control the vertical position of the output member. The follower is preferably connected to at least one of the linkages. Such an arrangement is advantageous in that the guide track is relatively short in length and positioned in a relatively convenient location compared to arrangements in which a slat to be moved by the actuator arrangement has guide tracks associated therewith.

Two or more such guide tracks may be associated with the actuator arrangement, if desired.

Alternatively, the guide means may comprise a linkage arrangement operated by a second actuator arrangement and connected to the output member. In such an arrangement, adjustment of the linkage arrangement by the second actuator arrangement can be used to adjust the vertical position and angle of the output member.

The invention will further be described, by way of example, with reference to the accompanying drawings, in which.

Figure 1:
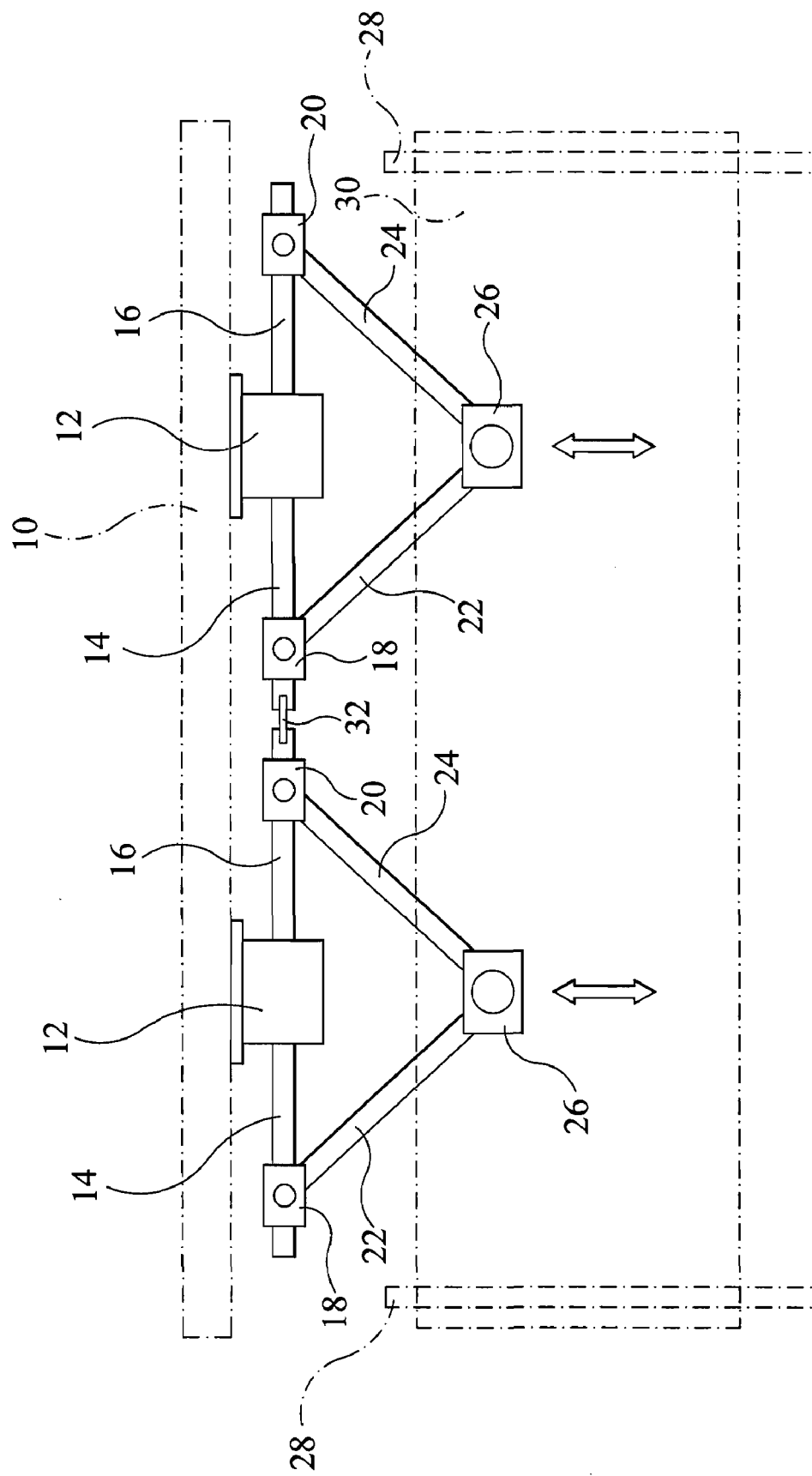
FIG. 1 is a diagrammatic view of a pair of actuator arrangements in accordance with one embodiment of the invention, in use.

As illustrated in FIG. 1, a front spar 10 of an aircraft wing carries a pair of gearboxes 12. Each gearbox 12 is arranged to drive respective first and second screw shafts 14, 16 for rotation. The screw shafts 14, 16 are supported, in use, by the front spar 10 through appropriate support bearings (not shown). The screw shafts 14, 16 are arranged coaxially with one another and each screw shaft 14, 16 is provided with a screw thread formation (not shown).

Associated with each screw shaft 14, 16 is a respective nut 18, 20, the nuts 18, 20 being formed with grooves within which are located ball or roller components which also cooperate with the screw thread formations of the screw shafts 14, 16 such that rotation of the screw shafts 14, 16, whilst the nuts 18, 20 are held against rotation, causes each nut 18, 20 to translate along the respective screw shaft 14, 16 in a ball or roller-screw like fashion.

The nature of the gearbox 12 and the handedness of the thread formations are chosen such that when each of the first nuts 18 is driven towards the right in the orientation illustrated, the second nuts 20 are driven towards the left, and vice versa. Thus, for each actuator arrangement, rotation of the screw shafts 14, 16 results in the first and second nuts 18, 20 being driven either towards one another or away from one another.

Pivotally connected to each nut 18, 20 is a respective linkage 22, 24, the linkages 22, 24 of each actuator arrangement being pivotally connected at their ends remote from the nuts 18, 20 to a respective output member 26.

The aircraft wing is provided with a pair of guide tracks 28 arranged to support and guide the movement of a flight control surface in the form of a slat 30. The output members 26 of the two actuator arrangements are pivotally mounted upon the slat 30. It will be appreciated that the mounting of the output members 26 on the slat 30 holds the linkages 22, 24 such that only limited angular movement of the nuts 18, 20 is permitted.

In use, with the slat 30 in a fully retracted position, the first and second nuts 18, 20 of each actuator arrangement will be spaced apart from one another by a relatively large distance. When it is desired to move the slat 30 towards its extended position, either to a fully extended position or to an intermediate position, the first and second screw shafts 14, 16 of each actuator arrangement are driven to cause the nuts 18, 20 associated therewith to be driven towards one another. The movement of the nuts 18, 20 towards one another is transmitted through the linkages 22, 24 to the output members 26, driving the output members 26 in a direction substantially perpendicular to the axis of rotation of the screw shafts 14, 16, away from the screw shafts 14, 16. As the output members 26 are secured to the slat 30, the movement of the output members 26 drives the slat 30 towards its extended position.

As mentioned hereinbefore, the guide tracks 28 support the slat 30 and guide the slat 30 for movement, thus the shape of the guide tracks 28 can be chosen to result in the slat 30 being driven along a desired profile or path of movement, the pivotal mounting of the output members 26 to the slat 30, and a small amount of angular movement of the nuts 18, 20, accommodating variations in the direction of movement of the slat 30 and angular or tilting movement thereof.

Movement of the slat 30 in the reverse direction is achieved by rotation of the screw shafts 14, 16 in the reverse rotary direction resulting in the nuts 18, 20 of each actuator arrangement moving away from one another, thus drawing the output members 26 and slat 30 to the position shown.

In order to ensure that both actuator arrangements operate, in use, simultaneously and at the same speed as one another, a tie member 32 may be provided to tie one of the screw shafts of one actuator arrangement to one of the screw shafts of the other actuator arrangement, thereby ensuring that rotation of these two screw shafts is synchronised. The tie member 32 may further serve to transmit drive between the actuator arrangements, and between actuator arrangements associated with other control surfaces to be moved simultaneously along with the slat 30.

The nature of the actuator arrangements described hereinbefore is such that they can be accommodated alongside the front spar of the wing and do not need to pass through the front spar. Weakening of the front spar and reinforcement of the front spar can thus be avoided, and it may be possible to avoid having to redesign or place unnecessary design constraints upon, for example, the aircraft's fuel tanks. Further, as mentioned hereinbefore, movement of the slat over a relatively complex profile can be attained.

It may be possible, by using a more complex form of linkage arrangement, to support and guide the slat for movement using the actuator arrangement alone, avoiding the use of guide tracks.

Figure 2:
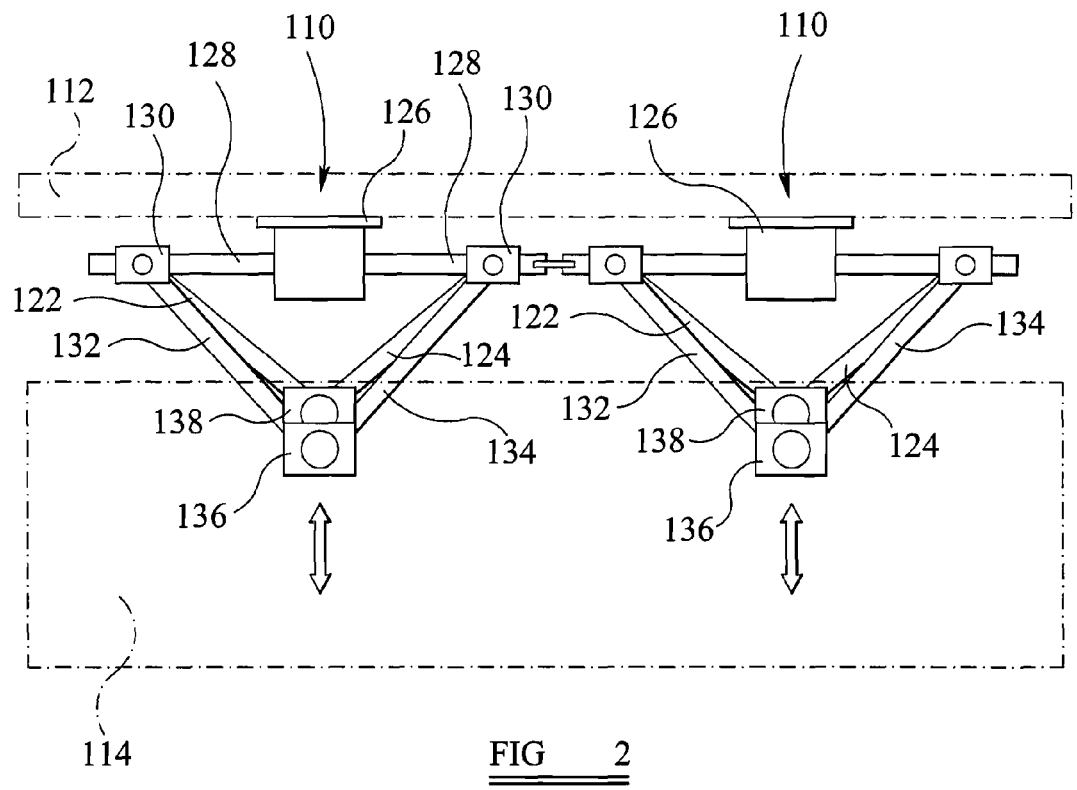
FIG. 2 is a diagrammatic plan view illustrating an actuator arrangement in accordance with another embodiment of the invention.
Figures 3, 4:
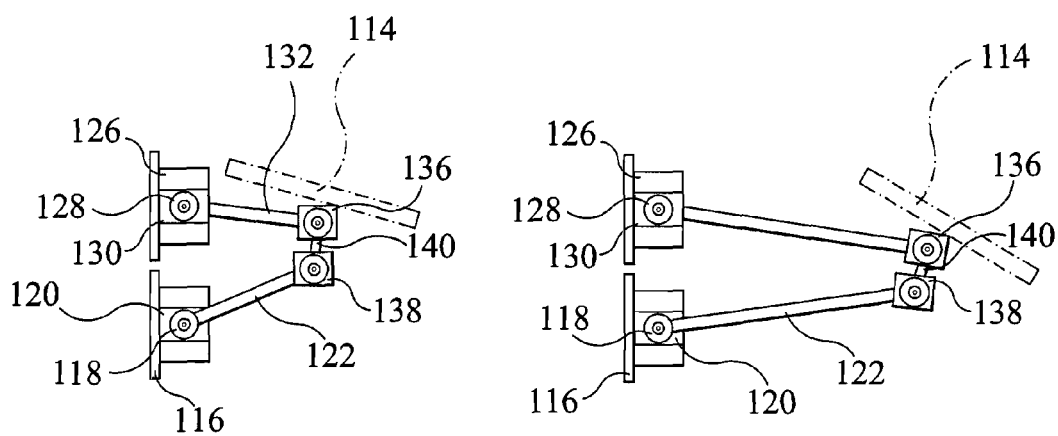
FIGS. 3 and 4 are side views illustrating the arrangement of FIG. 2 in retracted and extended positions.

Referring next to FIGS. 2 to 4 there is illustrated a pair of actuator arrangements 110 mounted to a front spar 112 of an aircraft's wing and operable to drive a slat panel 114 thereof between retracted and extended positions.

Each actuator arrangement 110 comprises a gearbox 116 secured to the front spar 112 and arranged to drive respective first and second screw shafts 118 for rotation. The screw shafts 118 are supported, in use, by the front spar 112 through appropriate support bearings (not shown). The screw shafts 118 are arranged coaxially with one another and each screw shaft 118 is provided with a screw thread formation (not shown).

Associated with each screw shaft 118 is a respective nut 120, the nuts 120 being formed with grooves within which are located ball or roller components which also cooperate with the screw thread formations of the screw shafts 118 such that rotation of the screw shafts 118, whilst the nuts 120 are held against rotation, causes each nut 120 to translate along the respective screw shaft 118 in a ball or roller-screw like fashion.

The nature of the gearbox 116 and the handedness of the thread formations are chosen such that the nuts 120 are either driven towards one another or away one another, depending upon the direction in which the actuator arrangement is being driven.

Pivotally connected to each nut 120 is a respective linkage 122, 124, the linkages 122, 124 of each actuator arrangement 110 being pivotally connected at their ends remote from the nuts 120 to an output member 138.

Also mounted to the front spar 112, and located above the gearbox 116, shafts 118 and nuts 120 of each actuator arrangement 110 is a second gearbox 126 arranged to drive screw shafts 128 upon which nuts 130 are mounted, the rotation of the screw shafts 128 and handedness of the threads thereof being such that the nuts 130 are driven either towards or away from one another. Linkages 132, 134 connect each nut 130 to a connecting member 136. It will be appreciated that the shafts 128, nuts 130 and linkages 132, 134 form a second actuator, which operates to drive the connecting member for movement in a manner similar to that by which the output member 138 is driven by the shafts 118, nuts 120 and linkages 122, 124.

The connecting member 136 and output member 138 are coupled to one another by a connector 140 which further serves to mount the slat panel 114 to the output member 138.

The nuts 120, 130 allow the linkages 122, 124, 132, 134 to pivot about the axes of rotation of the screw shafts 118, 128. The nature of the pivotal connections between the linkages 122, 124 and the output member 138 are such that the attitude of the output member 138 is fixed relative to the linkages 122, 124. Likewise, the connection of the connector 140 to the output member 138 and connection member 136 is such that the attitude of the connection member 136 is fixed relative to the output member 138 and linkages 122, 124. The connection between the linkages 132, 134 and the connection member 136 permits relative movement in the attitudes thereof.

In use, with the slat panel 114 in a fully retracted position, the first and second nuts 120 of each actuator arrangement will be spaced apart from one another by a relatively large distance. Similarly, the nuts 130 will be spaced apart from one another. When it is desired to move the slat panel 114 towards its extended position, either to a fully extended position or to an intermediate position, the first and second screw shafts 118 of each actuator arrangement are driven to cause the nuts 120 associated therewith to be driven towards one another. The movement of the nuts 120 towards one another is transmitted through the linkages 122, 124 to the output members 138, driving the output members 138 in a direction substantially perpendicular to the axis of rotation of the screw shafts 118, away from the screw shafts 118. As the output members 138 are secured to the slat panel 114, the movement of the output members 138 drives the slat panel 114 towards its extended position.

Simultaneously with this movement, the screw shafts 128 are rotated, driving the nuts 130 towards one another, and this movement is transmitted by the linkages 132, 134 and the connection member 136 to the output member 138.

As shown in FIGS. 3 and 4, by appropriate control over the rate of movement of the connection member 136 relative to that of the output member 138, the angle of the linkages 122, 124, and hence the vertical position and the angle of the output member 138 and the slat panel 114 itself can be controlled and adjusted as the slat panel 114 is moved from its retracted position towards its extended position, thereby enabling movement of the slat panel 114 over a relatively complex path of movement without requiring the slat panel 114 to be guided by guide tracks. As shown in FIGS. 3 and 4, the arrangement illustrated is designed such that the angle of attack of the slat panel 114 increases as the slat panel 114 is moved to its extended position.

Retracting movement is achieved by driving the screw shafts 118, 128 in the reverse direction, driving the nuts 120 and the nuts 130 apart and causing the linkages 122, 124, 132, 134 and the output member 138 to return to the position shown in FIG. 3.

The two sets of shafts 118, 128 may be driven simultaneously at the same speed as one another, for example by a common motor, or alternatively a more complex control and drive scheme may be employed in the driving of the shafts 118, 128.

Figure 5:
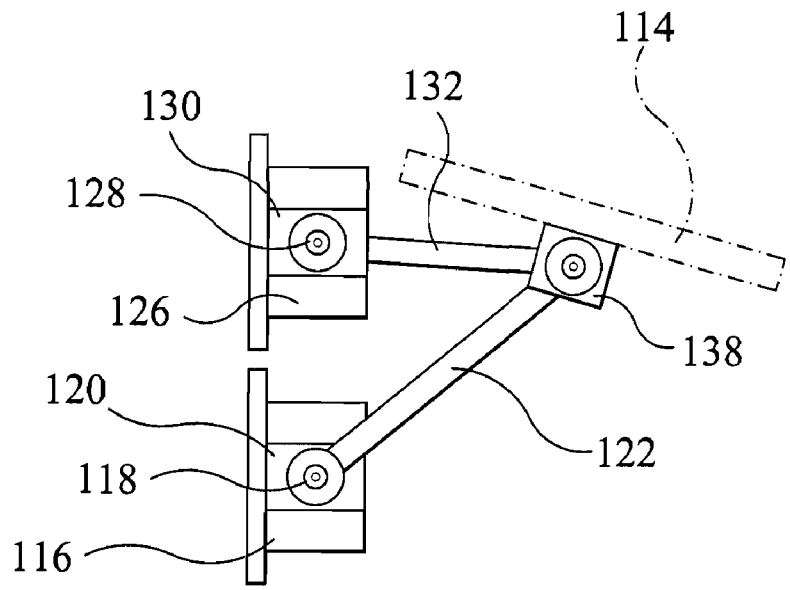
FIGS. 5 and 6 are views similar to FIGS. 3 and 4 illustrating a modification.
Figure 6:
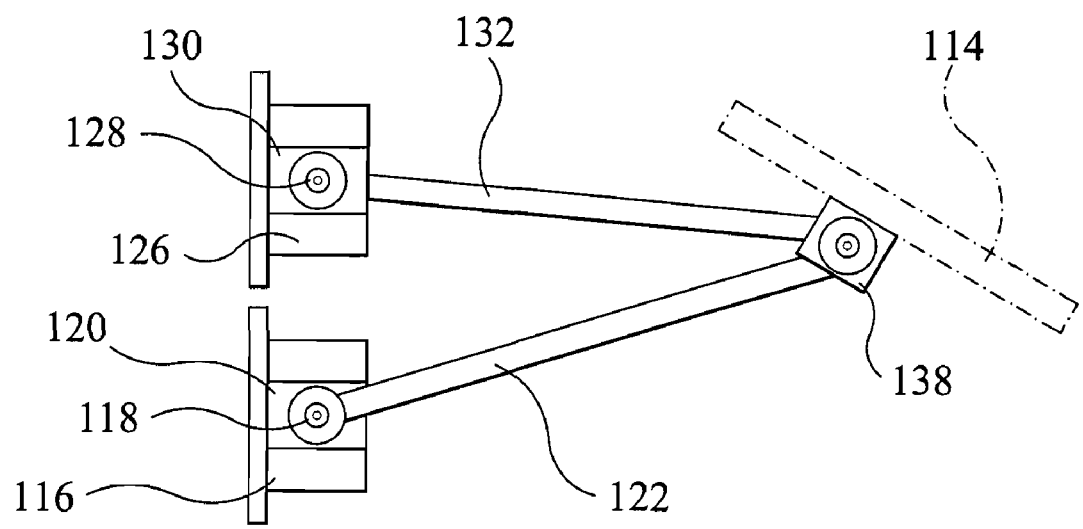
Figure 7:
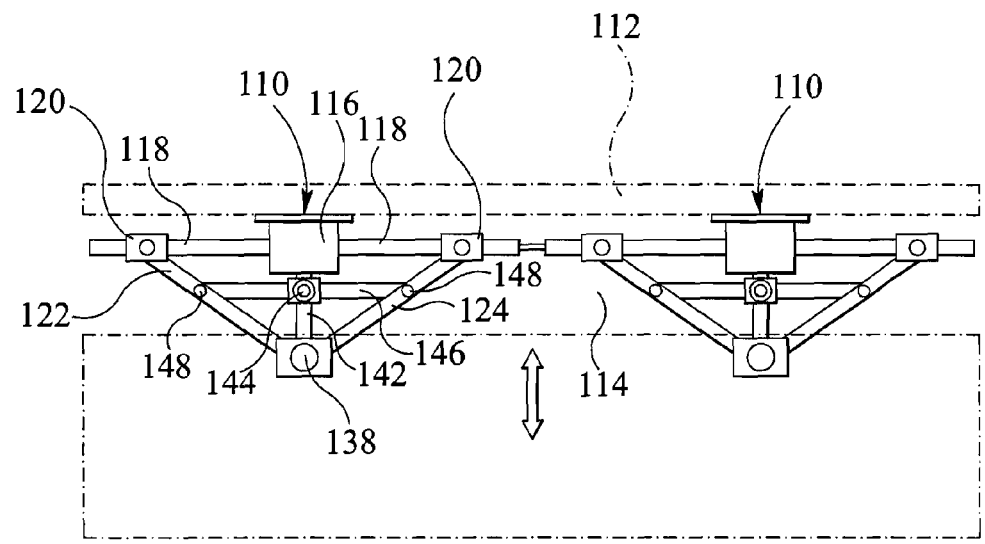
FIG. 7 is a diagrammatic plan view illustrating another alternative embodiment.

FIGS. 5 and 6 illustrate an arrangement similar to that of FIGS. 2 to 4 but in which the connection member 136 is omitted, both sets of linkages 122, 124, 132, 134 being connected to the output member 138. Again, the connections of the linkages 122, 124 to the output member 138 are such that the attitude of the output member 138 is fixed relative to the linkages 122, 124, but moveable relative to the linkages 132, 134. Operation of the of the embodiment of FIGS. 5 and 6 is very similar to that of FIGS. 2 to 4 and so will not be described in further detail.

Referring next to FIGS. 7 to 10, a slat panel 114 is again moveable relative to a front spar 112 by a pair of actuator arrangements 110. As in the arrangement of FIGS. 2 to 4 each actuator arrangement 110 includes a pair of screw shafts 118 rotatable by a gearbox 116, each screw shaft 118 cooperating with a respective nut 120 such that rotation of each screw shaft 118 causes translation of the associated nut 120. In use, the nuts 120 are arranged to translate either towards one another or away from one another, depending upon the direction of the input drive. Each nut 120 has a linkage 122, 124 pivotally connected thereto, the linkages 122, 124 being connected to an output member 138 which is connected to the slat panel 114. The connection of the output member 138 to the linkages 122, 124 and the slat panel 114 is such that the attitude of the slat panel 114 is fixed relative to that of the linkages 122, 124.

A guide track 142 is rigidly connected to the front spar 112, for example by being rigidly mounted upon the gearbox 116. A follower 144 carried by a support bar 146 is arranged to run along the guide track 142, and to hold the support bar 146 in an orientation substantially perpendicular to the guide track 142. The follower 144 is secured to a central part of the support bar 146. Pins 148 carried by the linkages 122, 124 are received in slots (not shown) provided in the support bar 146.

The arrangement is such that the guide track 142, follower 144 and support bar 146 provide support for the linkages 122, 124, output member 138 and slat panel 114.

Figures 8, 9:
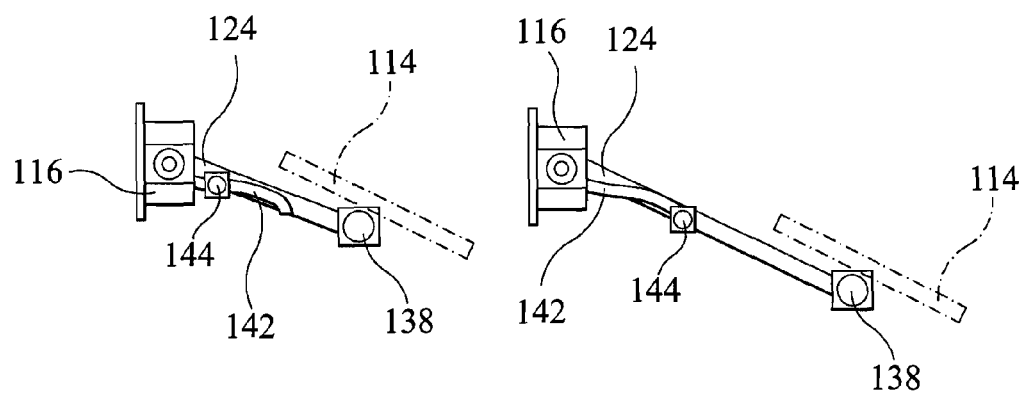
FIGS. 8 and 9 are side views illustrating the arrangement of FIG. 7 in retracted and extended positions.

As shown in FIGS. 8 and 9 the guide track 142 is of curved form.

Figure 10:
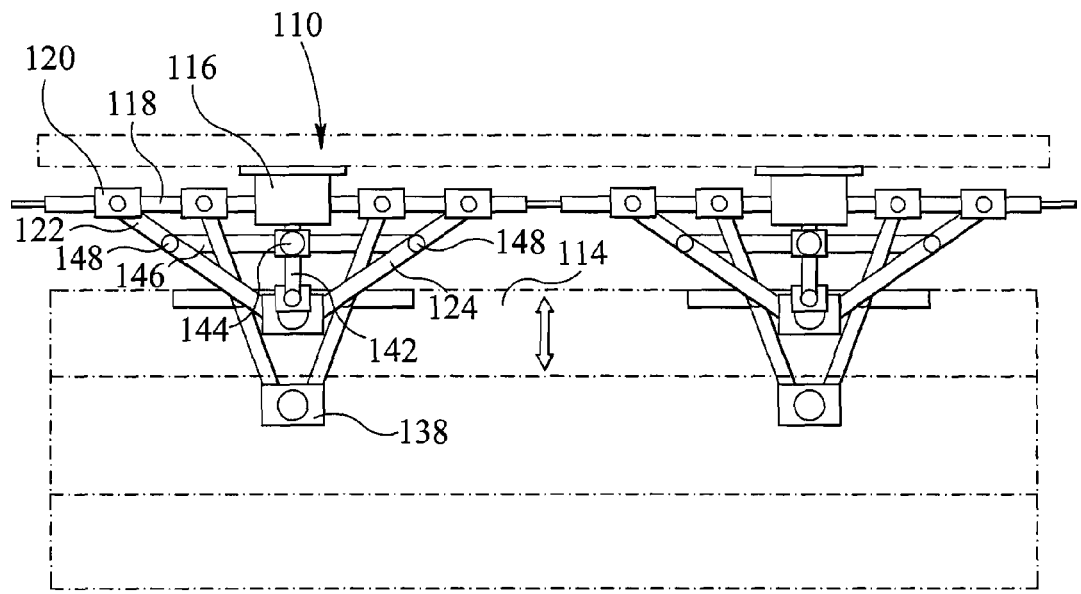
FIG. 10 is a plan view illustrating the operation of the arrangement of FIG. 7.

In use, starting from the retracted position shown in FIG. 8 if it is desired to move the slat panel 114 towards its extended position, the actuator arrangements 110 are driven such that the nuts 120 of each actuator arrangement 110 are driven towards one another, this movement being transmitted to the linkages 122, 124, causing the output member 138 and slat panel 114 to move as shown in FIG. 10. It will be appreciated that during this movement, the pins 148 drive the support bar 146 for movement and move along the slots provided in the support bar 146 as shown in FIG. 10, drawing the follower 144 along the guide track 142 and, as shown in FIGS. 8 and 9, this movement results in the attitude of the linkages 122, 124 and hence the attitude and vertical position of the output member 138 and slat panel 114 changing as the slat panel 114 is moved towards its extended position. Again, this is achieved without providing guide tracks for the slat panel itself.

Retraction of the slat panel 114 is achieved by reversing the direction in which the actuators are driven, the reverse movement being along substantially the same path of movement.

Figure 11:
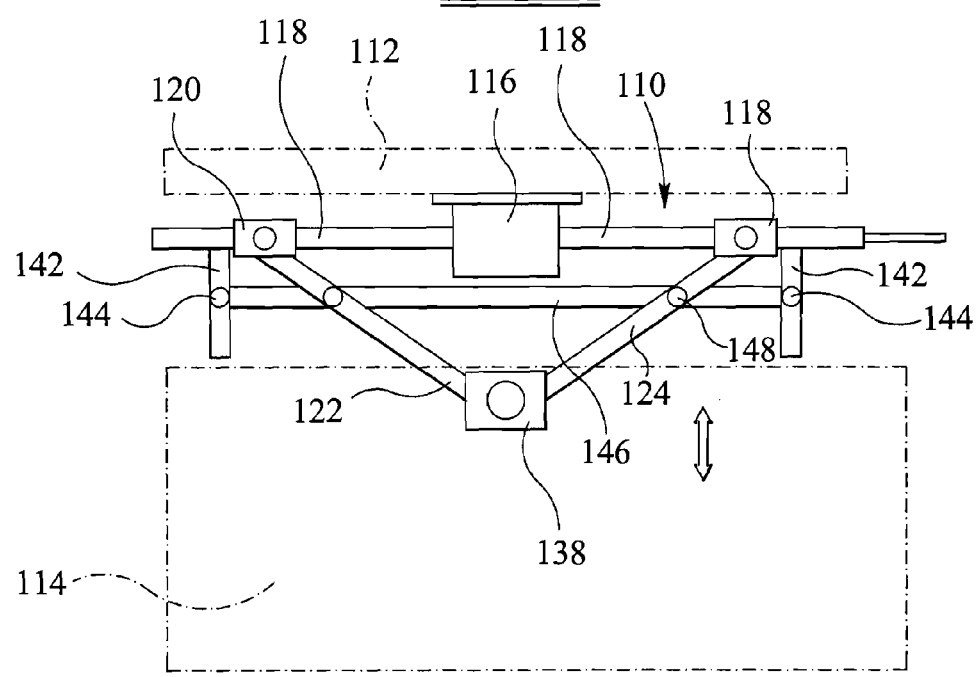
FIG. 11 is a diagrammatic plan view illustrating a further embodiment.

FIG. 11 shows an arrangement similar to that of FIG. 7 to 10 but in which the support bar 146 is of increased length, protruding beyond the linkages 122, 124, the support bar 146 having two followers 144 associated therewith, each running along a respective guide track 142 secured (by means not shown) to the front spar 112. As two guide tracks 142 are associated with each actuator arrangement 110, it may be possible to improve the load bearing capability of the actuator arrangement 110, or alternatively use smaller dimension guide tracks than in the arrangement of FIGS. 7 to 10.

Although the FIG. 11 embodiment only illustrates one actuator arrangement 110 associated with the slat panel 114, it is anticipated that two such actuator arrangements may be used therewith.

It will be appreciated that where additional stability and control over the angle of attack and vertical position of the slat panel 114 is required, the actuator arrangement illustrated in FIGS. 2 to 4 and FIGS. 5 and 6, respectively, may be further modified to incorporate a guide track 142, follower 144 and support bar 146, for example of the general type illustrated in FIGS. 7 to 10 or, alternatively, a pair of guide tracks 142, associated followers 144 and an increased length support bar 146, for example of the general type illustrated in FIG. 11.

In the arrangements of FIGS. 7 to 11, the angular movement of the linkages 122, 124 is fairly small, thus only a relatively small adjustment in the attitude of the slat 114 is achievable, the slat 114 being non-rotatably secured to the output member 138 and linkages 122, 124. If a greater degree of adjustment is required then this could be achieved by allowing angular movement between the slat 114 and the linkages 122, 124 such that their attitudes are not fixed relative to one another, and providing an additional arrangement for controlling the angle or attitude of the slat. For example, a guide track could be provided for the slat. Alternatively, an additional linkage or actuator arrangement may be provided to allow control over the angle of the slat.

A wide range of modifications and alterations may be made to the arrangements described hereinbefore without departing from the scope of the invention.

The invention claimed is:

1. An actuator arrangement comprising a first screw shaft, a first nut cooperating with the first screw shaft such that rotation of the first screw shaft causes the first nut to translate thereon, a second screw shaft, a second nut cooperating with the second screw shaft such that rotation of the second screw shaft causes the second nut to translate thereon, and first and second linkages connecting the first and second nuts, respectively, to an output member, rotation of the first and second screw shafts to cause translation of the first and second nuts towards one another causing extending movement of the output member and rotation of the first and second screw shafts to cause translation of the first and second nuts away from one another causing retracting movement of the output member, wherein the output member is designed to accommodate angular, tilting movement of a flight control surface connected to the output member relative to the first and second linkages.

2. An arrangement according to claim 1, wherein the first and second screw shafts are coaxial with one another.

3. An arrangement according to claim 1, wherein the flight control surface comprise a wing slat.

4. An arrangement according to claim 1, wherein at least a pair of actuator arrangements is associated with a single wing slat.

5. An arrangement according to claim 4, further comprising synchronisation means to ensure that the actuator arrangements are operated simultaneously at the same speed as one another.

6. An arrangement according to claim 1, further comprising guide track means provided to guide the wing slat for movement.

7. An arrangement according to claim 1, further comprising guide means for adjusting the vertical position of the output member relative to a datum position during extending and retracting movement thereof.

8. An arrangement according to claim 7, wherein the guide means comprises a guide track along which a follower rides to control the vertical position of the output member.

9. An arrangement according to claim 8, wherein the follower is connected to at least one of the linkages.

10. An arrangement according to claim 8, wherein two or more such guide tracks are associated with the actuator arrangement.

11. An arrangement according to claim 7, wherein the guide means comprises a linkage arrangement operated by a second actuator arrangement and connected to the output member.

12. An arrangement according to claim 11, wherein the second actuator arrangement comprises a first screw shaft, a first nut cooperating with the first screw shaft such that rotation of the first screw shaft causes the first nut to translate thereon, a second screw shaft, a second nut cooperating with the second screw shaft such that rotation of the second screw shaft causes the second nut to translate thereon, and first and second linkages connecting the first and second nuts, respectively, to the output member.

13. An arrangement according to claim 11, wherein the guide means further comprises a guide track along which a follower rides to control the vertical position of the output member.

14. An arrangement according to claim 13, wherein the follower is connected to at least one of the linkages.

15. An arrangement according to claim 13, wherein two or more such guide tracks are associated with the actuator arrangement.

* * * * *